(12) United States Patent
Ikuse et al.

(10) Patent No.: US 10,397,261 B2
(45) Date of Patent: Aug. 27, 2019

(54) IDENTIFYING DEVICE, IDENTIFYING METHOD AND IDENTIFYING PROGRAM

(71) Applicant: NIPPON TELEGRAPH AND TELEPHONE CORPORATION, Chiyoda-ku (JP)

(72) Inventors: Tomonori Ikuse, Musashino (JP); Kazufumi Aoki, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 222 days.

(21) Appl. No.: 15/514,748

(22) PCT Filed: Oct. 8, 2015

(86) PCT No.: PCT/JP2015/078670
§ 371 (c)(1),
(2) Date: Mar. 27, 2017

(87) PCT Pub. No.: WO2016/060067
PCT Pub. Date: Apr. 21, 2016

(65) Prior Publication Data
US 2017/0223040 A1    Aug. 3, 2017

(30) Foreign Application Priority Data

Oct. 14, 2014    (JP) .................. 2014-210221

(51) Int. Cl.
*H04L 29/06* (2006.01)
*G06F 16/22* (2019.01)
(Continued)

(52) U.S. Cl.
CPC .......... *H04L 63/1425* (2013.01); *G06F 16/22* (2019.01); *G06F 16/9024* (2019.01);
(Continued)

(58) Field of Classification Search
CPC ............. H04L 63/1408; H04L 63/1425; H04L 2463/144; G06F 17/30312;
(Continued)

(56) References Cited

U.S. PATENT DOCUMENTS 8,065,731 B1    11/2011    Nucci et al.
8,176,556 B1    5/2012     Farrokh et al.
(Continued)

FOREIGN PATENT DOCUMENTS

CN    100356288 C    12/2007
CN    103995814 A    8/2014
(Continued)

OTHER PUBLICATIONS

J.O. Kephart; S.R. White, Directed-Graph Epidemiological Models of Computer Viruses, ©1991 IEEE.Reprinted with permission from Proceedings of the 1991 IEEE Computer society Symposium on Research in Security and Privacy, Oakland, California, May 20-22, 1991, pp. 343-359 (Year: 1991).*

(Continued)

*Primary Examiner* — Shahriar Zarrineh
(74) *Attorney, Agent, or Firm* — Oblon, McClelland, Maier & Neustadt, L.L.P.

(57) ABSTRACT

An identifying device monitors malware to be analyzed and acquires, as log data, the malware, download data downloaded from a communication destination, and a relation of data transfer performed with the malware or the communication destination of the download data. Then, the identifying device creates, by using the acquired log data, a dependency relation graph that is a digraph in which the malware, download data, and communication destination are set as nodes and a dependency relation of each node is set as an edge. Then, the identifying device detects a malicious node by collating the respective nodes of the created dependency (Continued)

relation graph with the known maliciousness information, and traces an edge in a direction from a terminal point to a start point while setting the malicious node as a base point, and then identifies the traced node as a new malicious node.

5 Claims, 6 Drawing Sheets

(51) Int. Cl.
*G06F 16/901* (2019.01)
*G06F 21/55* (2013.01)
*G06F 21/53* (2013.01)
*G06F 21/56* (2013.01)

(52) U.S. Cl.
CPC ............ *G06F 21/55* (2013.01); *G06F 21/552* (2013.01); *H04L 63/1408* (2013.01); *G06F 21/53* (2013.01); *G06F 21/566* (2013.01); *H04L 2463/144* (2013.01)

(58) Field of Classification Search
CPC .. G06F 17/30958; G06F 21/55; G06F 21/552; G06F 21/53; G06F 21/566
USPC .......................................................... 726/23
See application file for complete search history.

(56) References Cited

U.S. PATENT DOCUMENTS

| | | | | |
|---|---|---|---|---|
| 8,316,448 B2* | 11/2012 | Peinado | .......... | G06F 21/52 726/25 |
| 8,341,745 B1* | 12/2012 | Chau | .......... | G06F 21/56 709/223 |
| 8,443,447 B1* | 5/2013 | Chen | .......... | H04L 63/145 713/188 |
| 8,516,585 B2* | 8/2013 | Cao | .......... | H04L 63/1441 713/187 |
| 8,566,944 B2* | 10/2013 | Peinado | .......... | G06F 21/566 711/154 |
| 8,826,444 B1* | 9/2014 | Kalle | .......... | H04N 21/25816 709/223 |
| 8,838,570 B1* | 9/2014 | English | .......... | H04L 63/1408 707/709 |
| 9,158,893 B2* | 10/2015 | Call | .......... | G06F 21/00 |
| 9,202,052 B1* | 12/2015 | Fang | .......... | G06F 21/56 |
| 9,225,730 B1* | 12/2015 | Brezinski | .......... | G06F 21/00 |
| 9,363,280 B1* | 6/2016 | Rivlin | .......... | H04L 63/1416 |
| 9,710,646 B1* | 7/2017 | Zhang | .......... | G06F 21/56 |
| 9,749,336 B1* | 8/2017 | Zhang | .......... | H04L 63/14 |
| 2004/0255165 A1* | 12/2004 | Szor | .......... | G06F 21/566 726/24 |
| 2007/0067844 A1* | 3/2007 | Williamson | .......... | G06F 21/566 726/24 |
| 2007/0226796 A1* | 9/2007 | Gilbert | .......... | G06F 21/55 726/22 |
| 2008/0028463 A1* | 1/2008 | Dagon | .......... | H04L 29/12066 726/22 |
| 2008/0271147 A1* | 10/2008 | Mohanan | .......... | G06F 21/552 726/24 |
| 2009/0113547 A1* | 4/2009 | Higashikado | .......... | G06F 21/552 726/23 |
| 2009/0328215 A1* | 12/2009 | Arzi | .......... | G06F 21/316 726/23 |
| 2010/0115621 A1* | 5/2010 | Staniford | .......... | H04L 63/1416 726/25 |
| 2011/0035802 A1* | 2/2011 | Arajujo, Jr. | .......... | G06F 11/079 726/23 |
| 2011/0113491 A1* | 5/2011 | Altshuler | .......... | H04L 63/1425 726/24 |
| 2011/0265182 A1* | 10/2011 | Peinado | .......... | G06F 21/554 726/24 |
| 2011/0321160 A1* | 12/2011 | Mohandas | .......... | G06F 21/56 726/22 |
| 2013/0117848 A1 | 5/2013 | Golshan et al. | | |
| 2013/0263280 A1* | 10/2013 | Cote | .......... | G06F 21/62 726/26 |
| 2013/0268533 A1* | 10/2013 | Komarov | .......... | G06F 17/30864 707/740 |
| 2013/0326625 A1* | 12/2013 | Anderson | .......... | G06F 21/56 726/23 |
| 2014/0012847 A1* | 1/2014 | Barnes, II | .......... | G06F 21/562 707/737 |
| 2014/0059684 A1* | 2/2014 | Wyschogrod | .......... | G06F 21/562 726/23 |
| 2014/0310808 A1* | 10/2014 | Yao | .......... | G06F 21/316 726/22 |
| 2015/0020199 A1* | 1/2015 | Neil | .......... | H04L 63/1433 726/23 |
| 2015/0264062 A1 | 9/2015 | Hagiwara et al. | | |
| 2016/0219066 A1* | 7/2016 | Vasseur | .......... | H04L 63/1425 |
| 2017/0093900 A1* | 3/2017 | Nomura | .......... | G06F 11/3476 |

FOREIGN PATENT DOCUMENTS

| | | |
|---|---|---|
| JP | 2016-68282 A | 5/2016 |
| WO | WO 2013/067505 A1 | 5/2013 |
| WO | WO 2014/087597 A1 | 6/2014 |

OTHER PUBLICATIONS

Extended European Search Report dated Sep. 1, 2017 in Patent Application No. 15851421.6.
Pratyusa K. Manadhata, et al. "Detecting Malicious Domains via Graph Inference", ESORICS, XP002772972, 2014, pp. 1-18.
International Search Report dated Dec. 8, 2015 in PCT/JP2015/078670 filed Oct. 8, 2015.
Decision to Grant a Patent dated Jan. 31, 2017 in Japanese Patent Application No. 2016-554061 (with English language translation).
Tomonori Ikuse, et al., "Identifying C&C Server by Analyzing Relation between Control Flow and Communications", IEICE Technical Report, vol. 113, No. 502, Mar. 2014, 8 Pages.
Yuhei Kawakoya, et al., "Tracing Malicious Code with Taint Propagation", Transactions of Information Processing Society of Japan (Journal), vol. 54, No. 8, Aug. 15, 2013, pp. 2079-2089.
Tomonori Ikuse, et al., "Malware Download Site Detection Based on Dependencies between Remote Servers and Malware Behavior" Computer Security Symposium 2014, vol. 2014, No. 2, Dec. 24, 2014, 10 Pages.
Mitsuhiro Hatada, et al., "A Study on Light-weight URL Blacklist Generation based on Sandbox Analysis", Collection of Papers in Computer Security Symposium, 2013, 6 Pages.
Combined Chinese Office Action and Search Report dated Jan. 4, 2019 in Chinese Patent Application No. 201580055319.7 (with English translation and English translation of Category of Cited Documents), 14 pages.

* cited by examiner

IDENTIFYING DEVICE, IDENTIFYING METHOD AND IDENTIFYING PROGRAM

FIELD

The present invention relates to an identifying device, an identifying method, and an identifying program.

BACKGROUND

Recently, most of malware such as a bot and a downloader acquires/executes a program code from a site installed with a malicious program (hereinafter referred to as a malware download site) and performs functional expansion. In such functional expansion, a function to cause additional damages such as attack to an external server and exploitation of information may be added. Therefore, in order to minimize the damages after infection, it is necessary to obstruct communication to the malware download site and block functional expansion.

Recently, there is a countermeasure taken in which a blacklist of communication destinations obtained from dynamic analysis on malware is created in order to obstruct communication to the malware download site. Since the malware acquires/executes a program code also from a legitimate site as well, in the case where all of the communication destinations obtained from the dynamic analysis are included in the blacklist, communication may be erroneously cut off.

Therefore, as disclosed in Non Patent Literature 1, a download site is identified based on whether a downloaded file is malware. Generally, determination processing on whether malware or not is performed based on an inspection result of antivirus software and behavior such as registry operation occurring at the time of file execution.

CITATION LIST

Non Patent Literature

Non Patent Literature 1: "A Study on Light-weight URL Blacklist Generation based on Sandbox Analysis" by Mitsuhiro Hatada, Yasuyuki Tanaka, and Takanori Inazumi from Collection of Papers in Computer Security Symposium 2013

SUMMARY

Technical Problem

However, in an above-described related art, there may be a problem in which a malicious site and malicious download data cannot be properly identified. In other words, in the related art, differentiating malware from downloaded data may not be correctly performed. Therefore, a dependency relation between a communication destination of communication and an object (program code or file) generated on an OS generated during dynamic analysis on the malware may not be analyzed, and a factor of communication occurrence and an acquisition source of file data may not be identified.

As a result, there may be problem in which a malicious site and malicious download data may be missed in the case where maliciousness of execution data cannot be directly determined and in the case of having a multistage structure in which a program code acquired from a download site further acquires and executes a program code from a different download site.

Also, most of malware performs functional expansion by acquiring/executing a program code from a malware download site. In the above-described related art, a blacklist to obstruct communication of malware to a malware download site is obtained based on dynamic analysis in order to prevent such functional expansion, but there may be a case in which a legitimate site is erroneously identified as a download site because the legitimate site is also included in the sites obtained in the dynamic analysis.

Solution to Problem

An identifying device includes: a monitoring unit configured to monitor malware to be analyzed and acquire, as log data, the malware, download data downloaded from a communication destination, and a relation of data transfer performed with the malware or the communication destination of the download data; a creating unit configured to create, by using the log data acquired by the monitoring unit, a dependency relation graph that is a digraph in which the malware, the download data, and the communication destination are set as nodes and a dependency relation of each node is set as an edge; and an identifying unit configured to detect a malicious node by collating the respective nodes of the dependency relation graph created by the creating unit with known maliciousness information, and trace an edge in a direction from a terminal point to a start point while setting the malicious node as a base point, and then identify a traced node as a new malicious node.

An identifying method executed in an identifying device, included processes of: monitoring malware to be analyzed and acquiring, as log data, the malware, download data downloaded from a communication destination, and a relation of data transfer performed with the malware or the communication destination of the download data; creating, by using the log data acquired in the monitoring process, a dependency relation graph that is a digraph in which the malware, the download data, and the communication destination are set as nodes and a dependency relation of each node is set as an edge; and detecting a malicious node by collating the respective nodes of the dependency relation graph created in the creating process with known maliciousness information, and tracing an edge in a direction from a terminal point to a start point while setting the malicious node as a base point, and then identifying a traced node as a new malicious node.

A non-transitory computer-readable recording medium having stored an identifying program to cause a computer to execute steps of monitoring malware to be analyzed and acquiring, as log data, the malware, download data downloaded from a communication destination, and a relation of data transfer performed with the malware or the communication destination of the download data;

creating, by using the log data acquired in the monitoring step, a dependency relation graph that is a digraph in which the malware, the download data, and the communication destination are set as nodes and a dependency relation of each node is set as an edge; and detecting a malicious node by collating the respective nodes of the dependency relation graph created in the creating step with known maliciousness information, and tracing an edge in a direction from a terminal point to a start point while setting the malicious node as a base point, and then identifying a traced node as a new malicious node.

Advantageous Effects of Invention

According to the present invention, there is an effect in which the malicious site and the malicious download data can be properly identified.

DESCRIPTION OF EMBODIMENTS

In the following, embodiments of an identifying device, an identifying method, and an identifying program according to the present application will be described in detail based on the drawings. Meanwhile, the identifying device, identifying method, and identifying program according to the present application are not limited by the embodiments.

First Embodiment

In the following embodiment, a configuration and a processing flow of an identifying device according to a first embodiment will be described in order, and an effect provided by the first embodiment will be described last.

[Configuration of Identifying Device According to First Embodiment]

Figure 1:
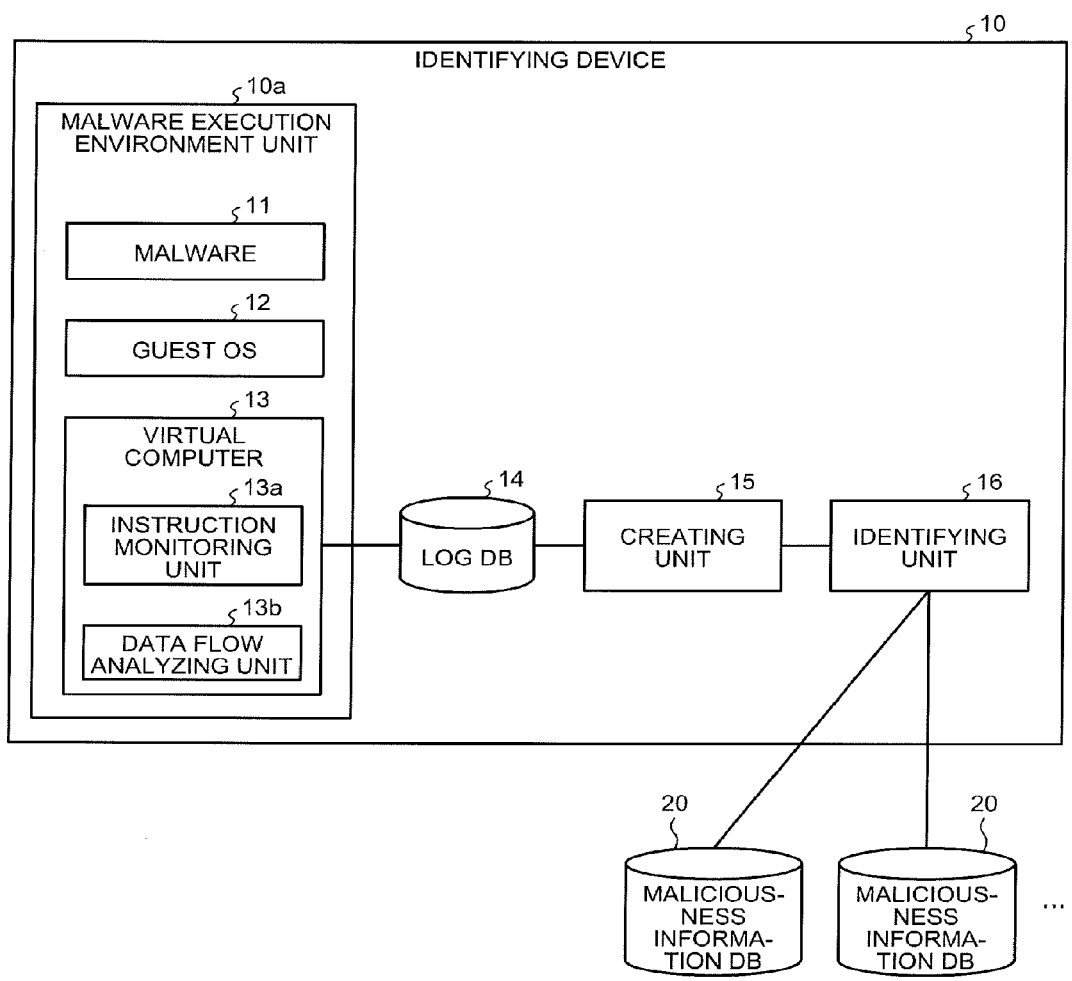
FIG. 1 is a schematic configuration diagram illustrating an entire structure of an identifying device according to a first embodiment.

First, an identifying device 10 according to a first embodiment will be described using FIG. 1. FIG. 1 is a schematic configuration diagram illustrating an entire structure of the identifying device according to the first embodiment. As illustrated in FIG. 1, the identifying device 10 includes a malware 11, a guest OS 12, a virtual computer 13, a log DB 14, a creating unit 15, and an identifying unit 16. Furthermore, the identifying device 10 is connected to a plurality of maliciousness information DBs 20 and acquires known maliciousness information from the maliciousness information DBs 20.

A malware execution environment unit 10a of the identifying device 10 is formed of the malware 11, guest OS 12, and virtual computer 13. The guest OS 12 is the environment to perform dynamic analysis for the malware 11. Furthermore, the malware 11 is executed on the guest OS 12 and executes an instruction such as calling an application programming interface (API) and issuing a system call. Meanwhile, on the guest OS 12, a process to be an attacking target of the malware 11 such as a browser may be actuated.

The malware execution environment unit 10a actuates the malware 11 on the guest OS 12, and tracks an instruction executed by the malware 11 and a data flow at the time of execution by using a taint analysis technology. The taint analysis technology is a technology in which a tag is set for data and data propagation inside an analysis system is tracked by propagating the tag in accordance with propagation rules. A tag is attribute information assigned to data, and an origin and a type of data are set. Furthermore, the propagation rules are the conditions to propagate a tag, and generally a data copy and operation are set as the propagation conditions. For example, in the case of analyzing usage of received data, a tag that can uniquely identify an acquisition source relative to the received data is set, and the tag is propagated in accordance with the data copy and operation. It is possible to analyze that the received data is data to be utilized as an API argument by confirming that the tag is set for data passed as the API argument. Meanwhile, the taint analysis technology is generally achieved by using a virtual computer technology, and the tag is held in an exclusive recording region different from the data so as to be correlated to the data. Specifically, the malware execution environment unit 10a installs, on the guest OS 12, the malware 11 to be analyzed and sets a monitoring target tag (tag in which a monitoring target flag is enabled) in a disk region correlated to a file of the malware 11. After that, the malware execution environment unit 10a executes the malware 11 to be analyzed.

In the malware execution environment unit 10a, an instruction monitoring unit 13a monitors an instruction executed by the malware 11, and a data flow analyzing unit 13b tracks a data receiving API and a data flow inside the malware execution environment unit 10a while setting a program code data of the malware as a starting point. The virtual computer 13 includes the instruction monitoring unit 13a and the data flow analyzing unit 13b.

The instruction monitoring unit 13a monitors the malware 11 to be analyzed and acquires, as log data: the malware 11; download data downloaded from a communication destination; and a relation of data transfer performed with the malware 11 or the communication destination of the download data.

Specifically, the instruction monitoring unit 13a performs monitoring by assigning a tag to a file of the malware 11, and in the case where the malware 11 calls the data receiving API that is a monitoring target API, and assigns a tag that can uniquely identify a transmission source of the data to data related to the API after enabling a monitoring target flag, and acquires log data by tracking propagation of the data assigned with the tag.

Describing details of processing of the instruction monitoring unit 13a, the instruction monitoring unit 13a acquires a value of an instruction pointer register while analyzing the malware 11, and makes an inquiry to the data flow analyzing unit 13b regarding whether a memory region indicated by the instruction pointer register is assigned with a monitoring target tag. Then, in the case where the monitoring target tag is set for the data as a result of the inquiry, the instruction monitoring unit 13a determines the instruction as the monitoring target. In the case where a call instruction of a monitoring target is executed and the target called by the call instruction is not a monitoring target API, all instructions in a nest deeper than this instruction are determined as operation content of a program code that has executed the call instruction of the monitoring target and set as the monitoring target. Meanwhile, the instruction monitoring unit 13a recognizes each instruction of the monitoring target, considering a call stack as well. This registration is cancelled at the time of returning to a next address of the call instruction.

Next, in the case of calling the monitoring target API, the instruction monitoring unit 13a performs processing in accordance with a category of the monitoring target API. There are roughly three categories. One is an API to set a tag, another one is an API to confirm a tag, and the last one is an API to perform both setting and confirming. A kind of category to which each of the APIs belongs is preliminarily set.

For example, the data receiving API is the API to set a tag, and data transmitting API is the API to confirm a tag. Furthermore, a file writing API and a memory writing API used for code injection are the APIs to confirm a tag and set the tag. In the API to set a tag, a tag that can uniquely identify an acquisition source is set. By performing such processing, a program code of the malware and receiving usage of received data at the time of analyzing the malware are analyzed, and a result thereof is stored in the log DB 14.

Figure 2:
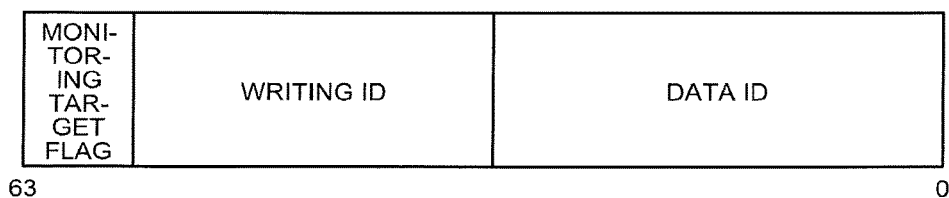
FIG. 2 is a diagram illustrating an exemplary structure of a tag.

Here, an exemplary structure of a setting tag will be described using FIG. 2. FIG. 2 is a diagram illustrating the exemplary structure of a tag. In the example of FIG. 2, a tag having a 64-bit length is illustrated. As illustrated in FIG. 2, the tag is formed of a monitoring target flag, a writing ID, and a data ID.

The monitoring target flag is a flag value indicating an execution monitoring target. Additionally, the writing ID is a value to control whether data assigned with a tag corresponds to data written in a file or a memory, and provided with a unique value at the time of file writing and at the time of code injection. The last data ID is a value that can uniquely identify an acquisition source of data.

Here, note that the acquisition source is communication destination information (IP address, fully qualified domain name (FQDN), uniform resource locator (URL), etc.) which are information related to a sending source of received data. Granularity of the communication destination is preliminarily determined before analysis in accordance with information desired to be extracted in the identifying unit 16. Meanwhile, the writing ID and data ID take zero as a value indicating a state of no setting. In other words, a tag having a state in which the monitoring target flag is 1 (enabled) and others are zero is the monitoring target tag set for the malware to be analyzed. Additionally, as for the data received in the data receiving API, a tag is set as follows: a monitoring target flag is 1, a writing ID is zero, and a data ID is other than zero. Meanwhile, communication destination information linked to a tag can be identified by monitoring/recording a network-related API executed by the malware at the time of executing malware analysis, and a length of the tag can be optionally changed in accordance with implementation within a range that can hold the monitoring target flag, writing ID, and data ID.

When an inquiry is received from the instruction monitoring unit 13a regarding whether a memory region indicated by an instruction pointer register is assigned with a monitoring target tag, the data flow analyzing unit 13b determines whether the inquired memory region is assigned with the monitoring target tag, and notifies the instruction monitoring unit 13a of a determination result as a result of the inquiry. The log DB 14 holds the log collected at the malware execution environment unit 10a.

The creating unit 15 creates, by using log data acquired by the instruction monitoring unit 13a, a dependency relation graph that is a digraph in which the malware 11, download data, and communication destination are set as the nodes and a dependency relation of each node is set as an edge. Here, note that each node in the dependency relation graph is to have a node having granularity in which existing maliciousness information can be mapped. Furthermore, an edge connected between nodes holds a data dependency relation as a relation property that can describe maliciousness of a start node on the ground of maliciousness of a terminal node. Specifically, a dependency relation related to data execution, a dependency relation related to data saving, and a dependency relation related to determination of a communication destination are held by using edges.

The dependency relation related to data execution holds acquisition source information of a program code and indicates presence of data execution. A case where received data from a communication destination is directly executed on a memory, a case where data read from a file is executed, and a case where data injected by a different program is executed fall under this dependency relation. This dependency relation is expressed by an edge having a program code as a terminal node.

The dependency relation related to data saving holds acquisition source information of file data. By holding this dependency relation, maliciousness of an acquisition source of data inside the file can be determined based on a maliciousness determination result on the file. A case where data received from a communication destination is saved in a file, a case where a file is copied, and a case where a program code cuts out itself as a file fall under this dependency relation. This dependency relation is expressed by an edge having a file as a terminal node.

In the dependency relation related to communication destination determination, the present dependency relation holds an origin of communication destination information. In the case of determining maliciousness based on a maliciousness determination result of a communication destination, not an origin of communication content but an origin of communication destination information that has determined the communication destination is important. The present dependency relation enables maliciousness determination on the origin of the communication destination information based on the maliciousness information of the communication destination. Determination of a communication destination by a communication destination, a file, and a program code falls under this dependency relation, and an edge having a communication destination as a terminal node expresses the present dependency relation.

Figure 3:
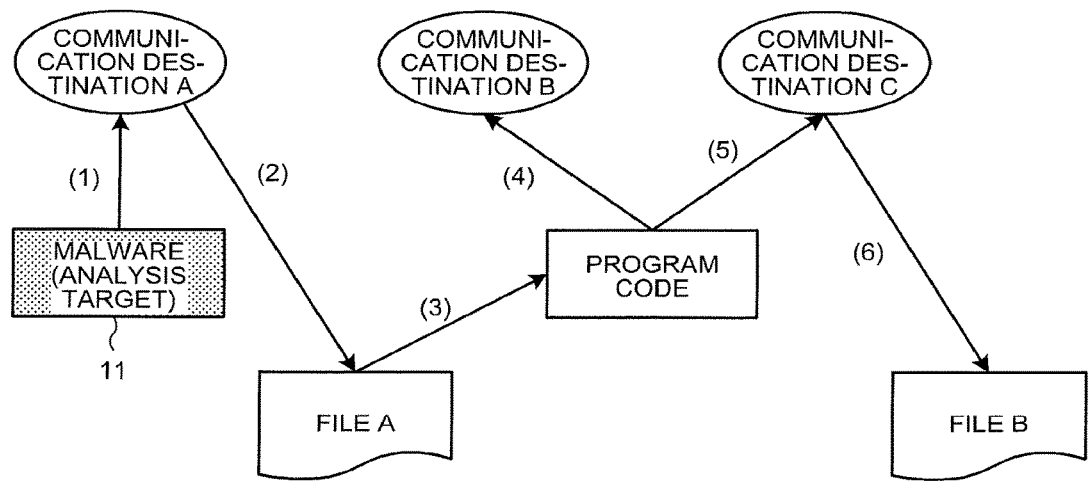
FIG. 3 is a diagram illustrating an exemplary dependency relation graph.

Here, an exemplary dependency relation graph will be described using FIG. 3. FIG. 3 is a diagram illustrating an exemplary dependency relation graph. As exemplified in FIG. 3, illustrated is the dependency relation when a file downloaded from a communication destination A is executed, communication between a communication destination B and a communication destination C is generated, and a new file is downloaded from the communication destination C. In this example, the dependency relation graph has a communication destination, a program code, and a file as nodes. A published black list can be mapped on the communication destination, a heuristic detection result such as calling an identifying API can be mapped on the program code, and an inspection result by anti-virus software can be mapped on the file respectively.

Furthermore, following dependency relations exist between these nodes. First, in the case of having the communication destination as a terminal node, an origin of communication destination information is set as a start node because not the program code itself that has executed communication but a factor having determined the communication destination is malicious. Furthermore, in the case of having a file node as a terminal node, an origin of file data is set as a start node. Finally, in the case of having the program code node as a terminal point, an origin of program code data is set as a start node. Using above-described nodes and edges, FIG. 3 illustrates a series of dependency relations from when the file A downloaded from the communication destination A is executed until when the new file B is acquired from the communication destination C.

Here, a process to create the dependency relation graph will be described. In an example here, it is assumed that following operation is performed in the malware execution environment unit 10a at the time of creating the dependency relation graph illustrated in FIG. 3. First, the malware 11 to be analyzed performs communication designating the communication destination A, and the file A is downloaded from the communication destination A. After that, the file A is executed as the program code, and the program code performs communication designating the communication destination B and the communication destination C. As a result thereof, the new file B is downloaded from the communication destination C. A description will be provided for the process to create the dependency relation graph, assuming that the above-described operation is performed in the malware execution environment unit 10a.

First, the malware execution environment unit 10a executes the malware 11 to be analyzed after setting a monitoring target tag in order to monitor only operation caused by a program code to be analyzed. Then, while the malware 11 to be analyzed is executed, the instruction monitoring unit 13a monitors API call related to communication, file writing, memory writing and presence of execution of data assigned with the monitoring target tag. In the case where the program code calls the data transmitting API during analysis, the instruction monitoring unit 13a confirms the tag set for data that designates communication destination information passed to the data transmitting API as an argument, and records the same together with the communication destination information.

At this point, the creating unit 15 determines that the program code has designated a communication destination in the case where the a tag same as the program code having called the data transmitting API is set for the data designating the communication destination information passed as the argument and in the case where no tag is set. Consequently, a dependency relation between the malware and the communication destination A ((1) of FIG. 4), a dependency relation between the program code and the communication destination B ((4) of FIG. 4), and a dependency relation between the program code and the communication destination C ((5) of FIG. 4) become clear, and the creating unit 15 connects the program code to be analyzed to the communication destination A with an edge, and connects the program code to the communication destination B with an edge.

Furthermore, in the case where the data receiving API is called, the malware execution environment unit sets a tag having a data ID to the received data, and the instruction monitoring unit 13a records the same together with the communication destination information of an acquisition source.

After that, in the case where the program code calls the file writing API, the instruction monitoring unit 13a propagates the tag to file data after setting a writing ID. Consequently, a dependency relation indicating that the received data from the communication destination A is written in the file A ((2) of FIG. 4) and the received data from the communication destination C is written in the file B ((6) of FIG. 4) can be tracked. Meanwhile, in the case where the writing ID is already set, the writing ID is overwritten. The instruction monitoring unit 13a stores, in the log DB 14, the tag that has been set for the data to be written together with a file name and a tag newly set for the data to be written in the file in order to express the dependency relation. The creating unit 15 connects the communication destination A to the file A with an edge and connects the communication destination C to the file B with an edge by using the log stored in the log DB 14.

Furthermore, whether the received data and the data written in the file are executed is determined by whether a tag having a data ID and a writing ID are set in a memory region indicated by the instruction pointer register. For example, in the case where the file downloaded from the communication destination A is executed, the writing ID is set for the executed data. When the writing ID is the same as the tag set for the data written in the file, it can be determined that the file is executed. On the other hand, in the case of being same as a tag set at the time of code injection, it can be determined that injected data is executed.

Meanwhile, in the case where only the data ID is set, it can be determined that the received data is directly executed on the memory. According to this mechanism, the dependency relation indicating that the file A downloaded from the communication destination A is executed as the program code can be tracked ((3) of FIG. 4). The instruction monitoring unit 13a records the tag linked to the executed data such that the creating unit 15 can express, on the graph, the dependency relations between the communication destination and the program code and between the file and the program code. The creating unit 15 connects the file A to the program code with an edge by using the log stored in the log DB 14.

The identifying unit 16 detects a malicious node by collating the respective nodes of the dependency relation graph created by the creating unit 15 with the known maliciousness information, and traces edges in a direction from a terminal point to a start point while setting the malicious node as a base point, and identifies a traced node as a new malicious node. Furthermore, in the case where the node identified as the malicious node is a communication destination node, the identifying unit 16 identifies this communication destination node as a malicious site, and additionally in the case where a node immediately before reaching this communication destination node is download data such as a file and a program code, the identifying unit detects this communication destination node as a malware download site.

Specifically, the identifying unit 16 maps existing maliciousness information on the dependency relation graph created by the creating unit 15. For example, in the case where a host name of a communication destination is "example.co.jp" and this host name is registered in existing maliciousness information such as a published blacklist, a relevant node on the dependency relation graph is assigned with information indicating maliciousness.

Finally, the identifying unit 16 tracks back the dependency relation while setting, as a starting point, the node determined as malicious by mapping processing, and determines a communication destination that can be reached from the node as malicious. Also, a file that can be reached is identified as a malicious file. After that, the identifying unit 16 outputs: a list of malicious communication destinations including a malware download site; and file information determined as malicious in the process. Thus, in the dependency relation graph, the dependency relation that can state maliciousness of the start node on the ground of maliciousness of the terminal node is held.

Figure 4:
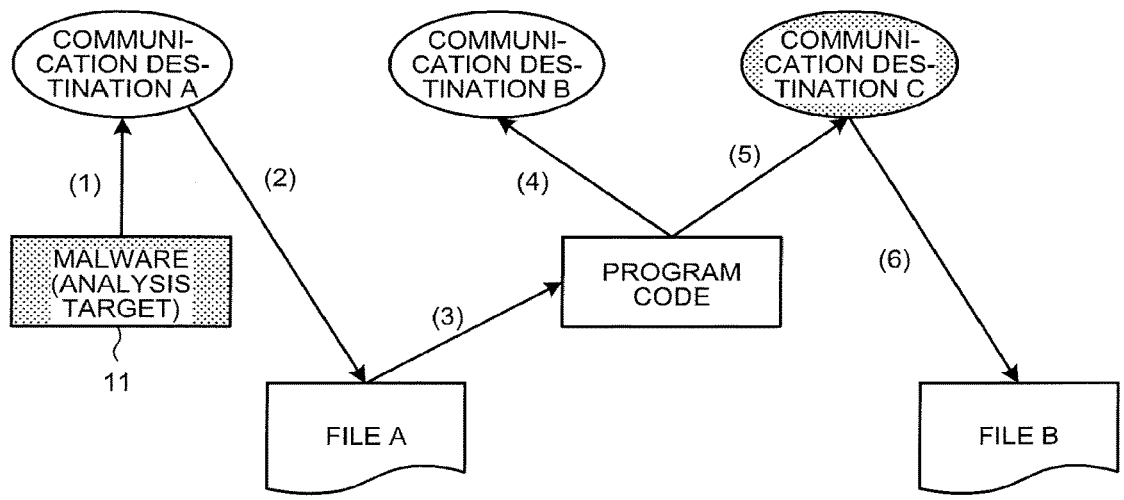
FIG. 4 is an explanatory diagram for maliciousness determination processing to determine a malicious node by using known maliciousness information.

For example, the identifying unit 16 collates the respective nodes of the dependency relation graph with the known maliciousness information and detects a malware node and the node of the communication destination C as malicious nodes as exemplified in FIG. 4. Then, as exemplified in FIG. 5, the identifying unit 16 traces the edges in the direction from the terminal point to the start point while setting the malicious node as a base point, and identifies the traced nodes, such as the communication destination A, file A, and program code, as the malicious nodes. Therefore, maliciousness can be determined by sequentially tracking back a dependency relation between two nodes connected with an edge.

Additionally, in the above-described maliciousness determination processing, a direction of the dependency relation plays an important role in order to avoid detection failure. Generally, the malware 11 includes an anti-analysis function in order to prevent execution under analysis environment. One of these functions is connection check to the internet utilizing a legitimate site, and the malware 11 discriminates whether analysis environment is isolated from the Internet by confirming presence of connection to a legitimate site.

Figure 5:
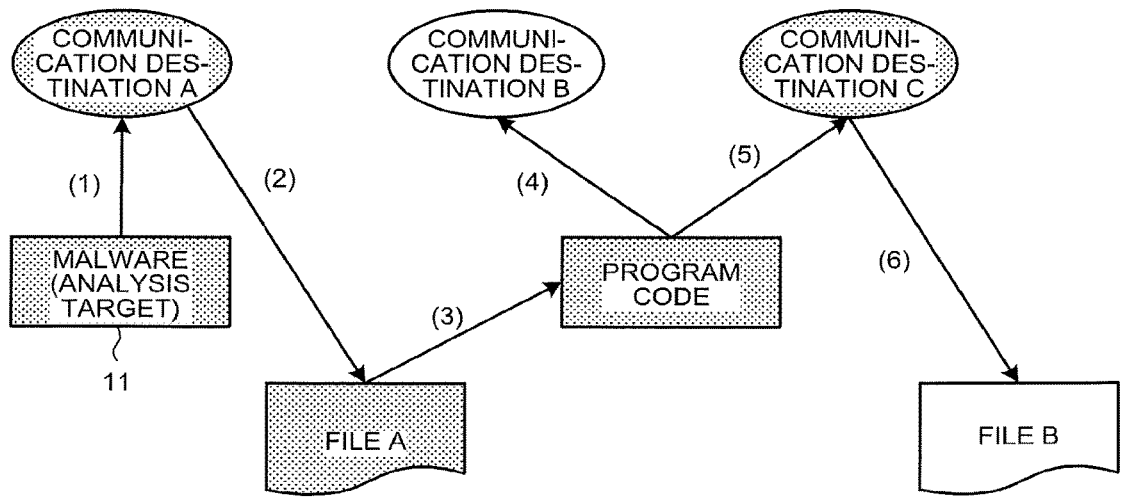
FIG. 5 is an explanatory diagram for identifying processing to identify a malicious communication destination by tracking back a dependency relation while setting a malicious node as a starting point.

In the case where connection check by the malware 11 is performed during dynamic analysis, a site used for connection check is also expressed as one of nodes on a dependency relation graph, and a data dependency relation is expressed by an edge directed from an origin of communication destination information to a communication destination. Therefore, a maliciousness determination result like FIG. 5 is obtained because even when the communication destination C is determined as malicious by the known maliciousness information as illustrated in FIG. 4, a dependency relation between the program code and the communication destination B cannot be tracked back. Therefore, there is no possibility that the communication destination B is determined as malicious. Thus, according to the present method of holding and utilizing the data dependency relation as the dependency relation graph, detection failure is avoided even when communication is made with a legitimate site for the purpose of connection check and the like.

Meanwhile, in the above description, the description has been provided on the basis that the analysis target is the malware, but the analysis target may also be a suspicious program code. In this case, maliciousness of the suspicious program code can be determined by using the identifying device 10. In other words, it is applicable to a method in which a suspicious program suspected as malware is actuated, tracing is performed from a node that is matched with the existing maliciousness information, and the malware is identified by reaching the suspicious program.

Furthermore, in the above description, reference is made only to the known maliciousness information, but maliciousness information to be applied may also be limited by using known non-maliciousness information. Examples of the known non-maliciousness information may be: a hash value of a file installed as standards on an OS in the case of a file; and a communication destination constantly generated while analyzing a domain name system (DNS) server, and a list of famous sites, and the like in the case of a communication destination.

[Exemplary Processing of Identifying Device]

Figure 6:
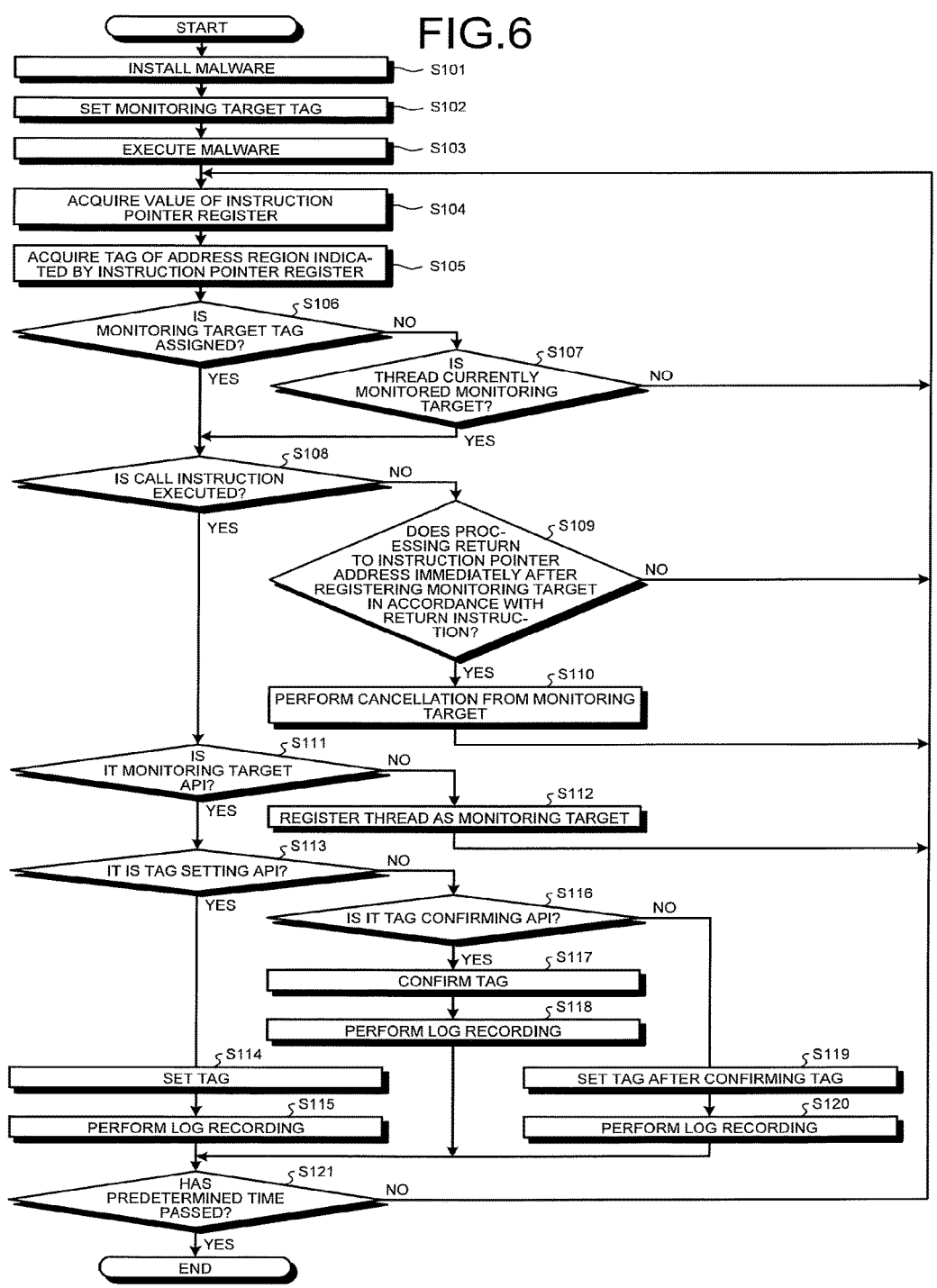
FIG. 6 is a flowchart illustrating a flow of log acquisition processing by the identifying device according to the first embodiment.
Figure 7:
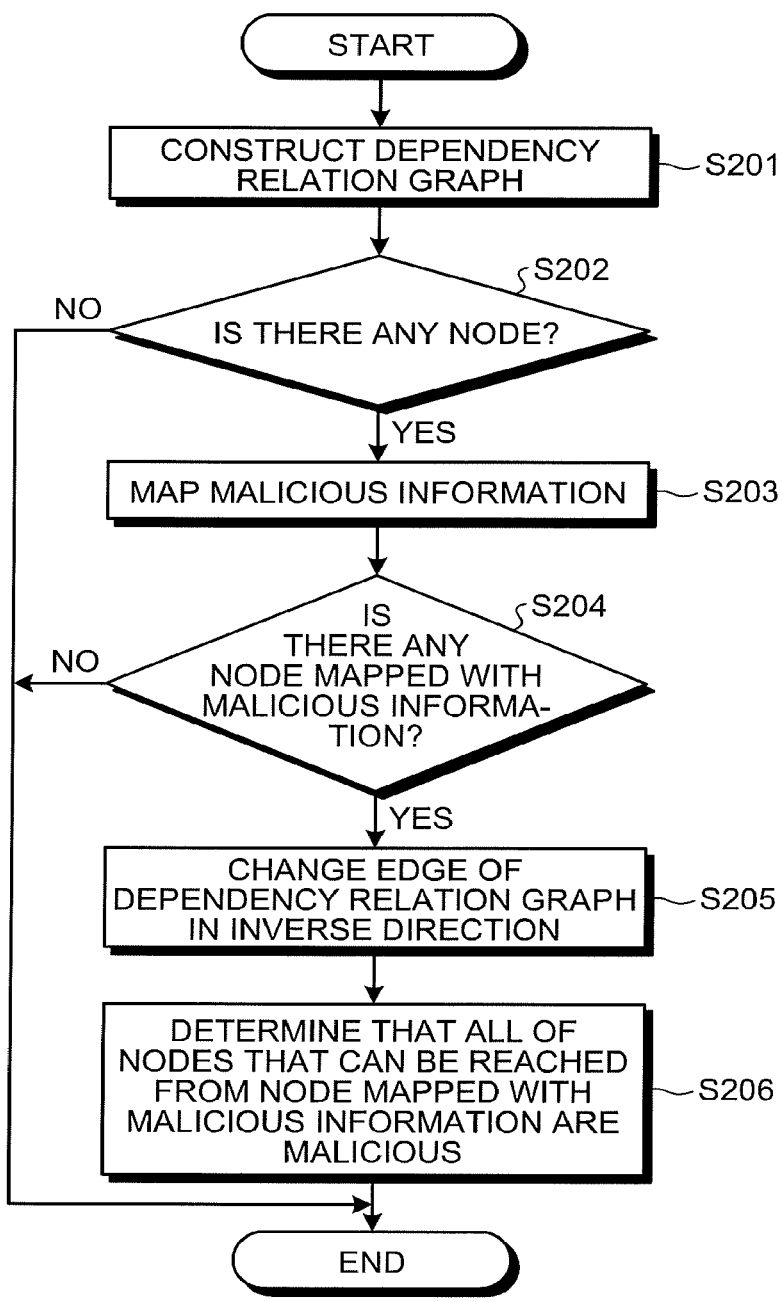
FIG. 7 is a flowchart illustrating a flow of identifying processing for malicious communication destination by the identifying device according to the first embodiment.

Next, processing of the identifying device 10 will be described using FIGS. 6 and 7. FIG. 6 is a flowchart illustrating a flow of log acquisition processing by the identifying device according to the first embodiment. FIG. 7 is a flowchart illustrating a flow of identifying processing for malicious communication destination by the identifying device according to the first embodiment.

First, the flow of the log acquisition processing by the identifying device 10 will be described using FIG. 6. As illustrated in FIG. 6, the malware execution environment unit 10a of the identifying device 10 installs the malware 11 to be analyzed on the OS 12 (Step S101) and sets a monitoring target tag to a disk region corresponding to a file of the malware 11 (Step S102). After that, the malware execution environment unit 10a executes the malware 11 (Step S103).

Then, the instruction monitoring unit 13a acquires a value of an instruction pointer register while analyzing the malware 11 (Step S104), and makes an inquiry to the data flow analyzing unit 13b regarding whether a memory region indicated by the instruction pointer register is assigned with a monitoring target tag. Then, the data flow analyzing unit 13b acquires a tag of an address region indicated by the instruction pointer register (Step S105), and notifies the instruction monitoring unit 13a of an inquiry result. Then, in the case where the monitoring target tag is not assigned to the data as a result of inquiry (Step S106 No), the instruction monitoring unit 13a determines whether a thread currently monitored is a monitoring target (Step S107). In the case where the instruction monitoring unit 13a determines that the thread currently monitored is not the monitoring target as a result thereof (Step S107 No), the processing returns to Step S104. Furthermore, in the case where the instruction monitoring unit 13a determines that the thread currently monitored is the monitoring target (Step S107 Yes), the processing proceeds to Step S108.

In the processing in Step S108, the instruction monitoring unit 13a determines this instruction as the monitoring target and determines whether a call instruction of the monitoring target is executed (Step S108). In the case of determining that the call instruction is not executed as a result thereof (Step S108 No), the instruction monitoring unit 13a determines whether to return to an instruction pointer address immediately after registering the monitoring target in accordance with a return instruction (Step S109).

In the case where the instruction monitoring unit 13a determines not to return to the instruction pointer address immediately after registering the monitoring target in accordance with the return instruction (Step S109 No), the processing returns to Step S104. Additionally, in the case where the instruction monitoring unit 13a determines to return to the instruction pointer address immediately after registering the monitoring target in accordance with the return instruction (Step S109 Yes), cancellation from the monitoring target is performed (Step S110), and the processing returns to Step S104.

Additionally, in the case of determining that the call instruction is executed (Step S108 Yes), the instruction monitoring unit 13a determines whether the monitoring target API is called (Step S111). In the case where the monitoring target API is not called as a result thereof (Step S111 No), the instruction monitoring unit 13a registers the thread as a monitoring target (Step S112) and the processing returns to Step S104.

Additionally, in the case where the monitoring target API is called (Step S111 Yes), the instruction monitoring unit 13a determines whether it is the tag setting API (Step S113). In the case of determining that it is the tag setting API as a result thereof (Step S113 Yes), the instruction monitoring unit 13a sets a tag that can uniquely identify an acquisition source (Step S114) and records the tag in the log DB 14 together with communication destination information of the acquisition source (Step S115). For example, in the case of the data receiving API, the instruction monitoring unit 13a set a tag for data received from the data receiving API and records the tag in the log DB 14 together with communication destination information of an acquisition source of received data.

Additionally, in the case of determining that it is not the tag setting API (Step S113 No), the instruction monitoring unit 13a determines whether it is a tag confirming API (Step S116). In the case of determining that it is the tag confirming API as a result thereof (Step S116 Yes), the instruction monitoring unit 13a confirms a tag (Step S117) and records log such as the tag in the log DB 14 (Step S118). For example, in the case of the data transmitting API, the instruction monitoring unit 13a confirms a tag set for data passed to an argument as communication destination information, and records the tag in the log DB 14 together with the transmission destination information and a latest monitoring target tag that has caused execution of this API. Meanwhile, the latest monitoring target tag that has caused execution is identified by tracing call stack and confirming a program code assigned with the latest monitoring target.

Furthermore, in the case of determining that it is not the tag confirming API (Step S116 No), the instruction monitoring unit 13a sets a tag after confirming a tag (Step S119) and records the same in the log DB 14 together with a writing destination name (Step S120). For example, in the case of a file writing API and a memory writing API used for code injection, the instruction monitoring unit 13a sets a tag after confirming the tag, and records the confirmed tag and the set tag in the log DB 14 together with the writing destination name and the latest monitoring target tag that has caused execution of this API. Here, the writing destination name corresponds to a file name in the case of the file writing API, and corresponds to a process name of the writing destination in the case of the memory writing API used for code injection.

After finishing the processing in Step S115, Step S118, or Step S120, the instruction monitoring unit 13a determines whether a predetermined time has passed (Step S121), and in the case of determining that the predetermined time has not passed (Step S121 No), the processing returns to Step S104 Furthermore, in the case of determining that the predetermined time has passed (Step S121 Yes), the instruction monitoring unit 13a finishes the processing.

Next, how to construct a dependency relation graph will be described. In the creating unit 15, nodes and edges of a dependency relation are extracted from the log stored in the log DB 14. Dependency relations held in the dependency relation graph are: a dependency relation related to data execution; a dependency relation related to data saving; and a dependency relation related to communication destination determination.

An edge holding the dependency relation related to data execution has a program code as a terminal node and has a program code, a file, or a communication destination as a start node. The edge is created as follows based on the log stored in the log DB 14.

An edge in which both the terminal node and the start node are program codes is created in the case where a latest monitoring target tag that has caused execution is a tag written by the memory writing API. At this point, the program code assigned with the latest monitoring target tag that has caused execution of the memory writing API is to be the start node.

An edge in which the terminal node is a program code and the start node is a file is created in the case where the latest monitoring target tag that has caused execution is a tag written by the file writing API. At this point, the file set with this tag is to be the start node.

An edge in which the terminal node is a program code and the start node is a communication destination is generated in the case where the latest monitoring target tag that has caused execution is a tag set for data received from the communication destination. At this point, the communication destination is to be the start node.

An edge holding the dependency relation related to data saving has a file as a terminal node and has a program code, a file, or a communication destination as a start node. The edge is created as follows based on the log stored in the log DB 14.

An edge in which both the terminal node and the start node are files is created in the case where a tag set for a certain file is observed in writing data in a different file in the file writing API. For example, this corresponds to a case where a tag set at the time of performing writing in a file X is set for data to be written in a file Y. At this point, the file X is to be the start node and the file Y is to be the terminal node.

An edge in which the terminal node is a file and the start node is a program code is created in the case where a fact that a program code writes data having the same tag as the program code in a file is observed.

An edge in which the terminal node is a file and the start node is a communication destination is generated in the case where a tag of data to be written in a file is confirmed in the file writing API and a tag before setting a confirmed writing ID is a tag set for data received from the communication destination.

An edge holding the dependency relation related to communication destination determination has a communication destination as a terminal node and has a program code, a file, or a communication destination as a start node. The edge is created as follows based on the log stored in the log DB 14.

An edge in which both the start node and the terminal node are communication destinations is created in the case where a tag set for data passed to the data transmitting API as communication destination information is the same as a tag set for received data in the data receiving API. The start node is to be a sending source of the received data.

An edge in which the terminal node is a communication destination and the start node is a program code is created in the case where a tag is not set for the data passed to the data transmitting API as the communication destination information or in the case where a set tag is the same as a latest monitoring target tag that has caused execution of the data transmitting API. At this point, the start node is to be a program code having the latest monitoring target tag that has caused execution of the data transmitting API.

An edge in which the terminal node is a communication destination and the start node is a file is created in the case where a tag set for the data passed to the data transmitting API as the communication destination information is the same as a tag newly set for writing data in the file writing API. At this point, the start node is to be a writing destination file of the file writing API. The start nodes and the terminal nodes of the edges created by the above-described methods are to be the nodes on the dependency relation graph.

Next, a flow of identifying processing for a malicious communication destination by the identifying device 10 will be described using FIG. 7. As illustrated in FIG. 7, the creating unit 15 of the identifying device 10 constructs a dependency relation graph by using the log stored in the log DB 14 (Step S201). Then, the identifying unit 16 determines whether there is any node in the dependency relation graph (Step S202). In the case where there is no node as a result thereof (Step S202 No), the identifying unit 16 finishes the processing.

Furthermore, in the case where there is a node (Step S202 Yes), the identifying unit 16 maps existing maliciousness information on the dependency relation graph created by the creating unit 15 (Step S203). Then, the identifying unit 16 determines whether there is any node mapped with the maliciousness information (Step S204). In the case where there is no node mapped with the maliciousness information as a result thereof (Step S204 No), the identifying unit 16 finishes the processing. Furthermore, in the case where there is a node mapped with the maliciousness information (Step S204 Yes), the identifying unit 16 changes an edge of the dependency relation graph in an inverse direction (Step S205), traces the edge in the direction from a terminal point to a start point while setting a malicious node as a base point, and determines that all of nodes that can be reached from the node mapped with the maliciousness information are malicious (Step S206), and then finishes the processing. At this point, a communication destination corresponding to a communication destination node determined as the malicious site is detected as a malicious site, and furthermore, in the case where a node immediately before reaching the communication destination node is download data such as a file and a program code, this communication destination node is detected as a malware download site. Meanwhile, it is not always necessary to trace an edge after changing the edge of the dependency relation graph in an inverse direction, and the edge may also be traced in an inverse direction from the terminal point to the start point without inverting the edge.

[Effects of First Embodiment]

Thus, the identifying device 10 according to the first embodiment monitors the malware 11 to be analyzed and acquires, as log data: the malware 11, download data downloaded from a communication destination, and a relation of data transfer performed with the malware 11 or the communication destination of the download data. Then, by using acquired log data, the identifying device 10 creates a dependency relation graph that is a digraph in which the malware, download data, and communication destination are set as nodes and a dependency relation of each node is set as an edge. Then, the identifying device 10 detects a malicious node by collating each node of the created dependency relation graph with the existing maliciousness information, and traces the edge in the direction from a terminal point to a start point while setting the malicious node as a base point, and then identifies the traced node as a new malicious node. Therefore, a malicious site and malicious download data can be properly identified. In other words, the identifying device 10 is useful to identify a malicious communication destination including a malware download site, and effective in the case where maliciousness of execution data cannot be determined and in the case where a download site has a multi-stage structure.

For example, in the case where an identified node is a communication destination, this node can be detected as a malware download site. Furthermore, since communication to a legitimate site performed by the malware 11 is not allowed to be traced from known maliciousness information (edge is not connected in a direction from a terminal point to a start point), there is an effect that the legitimate site is not erroneously detected as the malware download site.

(System Configuration and Others)

Additionally, respective elements of respective devices illustrated in the drawings are based on a functional concept and are not necessarily physically configured as illustrated in the drawings. In other words, a concrete mode of separation/integration of each device is not limited to those illustrated in the drawings, and an entire part or one part thereof may be configured in a manner functionally or physically separated/integrated in an arbitrary unit depending on various kinds of loads and a use state. Furthermore, as for respective processing functions performed in the respective devices, an entire part or an optional part thereof may be achieved by a CPU and a program analytically executed by the CPU, or may be achieved as hardware by a wired logic. For example, the creating unit 15 and the identifying unit 16 may be integrated.

Additionally, among respective processing described in the present embodiment, the processing automatically performed in the description may also be entirely or partially performed manually. Alternatively, the processing manually performed in the description may also be entirely or partially performed automatically by a known method. Besides, the processing procedures, control procedures, concrete terms, and information including various kinds of data and parameters in the description and the drawings may be modified arbitrarily unless otherwise specified.

(Program)

Additionally, it is possible to create a program that describes the processing executed by the identifying device 10 according to the above-described embodiment in a language executable by a computer. In this case, the effects similar to the above-described embodiment can be obtained by the computer executing the program. Furthermore, the processing similar to the above-described embodiment may be achieved by recording the program in a recording medium readable by a computer and making the computer read the program recorded in this recording medium. In the following, an exemplary computer that executes an identifying program implementing functions similar to the identifying device 10 will be described.

Figure 8:
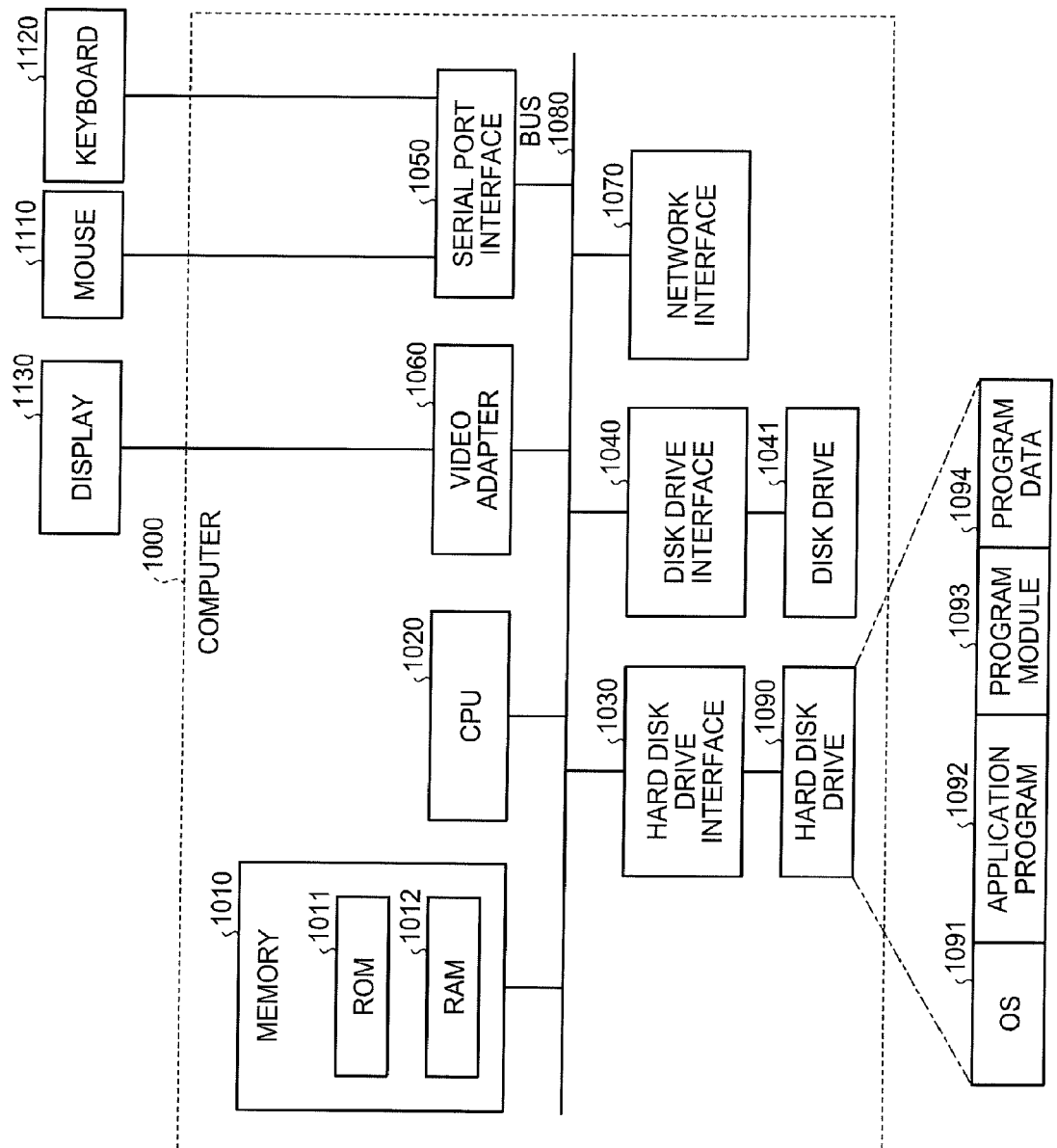
FIG. 8 is a diagram illustrating a computer that executes an identifying program.

FIG. 8 is a diagram illustrating a computer adapted to execute the identifying program. As illustrated in FIG. 8, a computer 1000 includes, for example, a memory 1010, a CPU 1020, a hard disk drive interface 1030, a disk drive interface 1040, a serial port interface 1050, a video adapter 1060, and a network interface 1070. These respective components are connected by a bus 1080.

The memory 1010 includes a read only memory (ROM) 1011 and a random access memory (RAM) 1012. The ROM 1011 stores, for example, a boot program such as a basic input output system (BIOS) and the like. The hard disk drive interface 1030 is connected to a hard disk drive 1090. The disk drive interface 1040 is connected to a disk drive 1041. In the disk drive 1041, a removable storage medium such as a magnetic disk or an optical disk is inserted. In the serial port interface 1050, for example, a mouse 1110 and a keyboard 1120 are connected. In the video adapter 1060, for example, a display 1130 is connected.

Here, as illustrated in FIG. 8, the hard disk drive 1090 stores, for example, an OS 1091, an application program 1092, a program module 1093, and program data 1094. Each table described in the above embodiment is stored in, for example, the hard disk drive 1090 and the memory 1010.

Additionally, the identifying program is stored in the hard disk drive 1090, for example, as a program module in which instructions executed by the computer 1000 are described. Specifically, the program module in which the respective processing executed by the identifying device 10 described in the above embodiment is stored in the hard disk drive 1090.

Furthermore, data used for information processing by the identifying program is stored as program data, for example, in the hard disk drive 1090. Then, the CPU 1020 reads out the program module 1093 and the program data 1094 stored in the hard disk drive 1090 to the RAM 1012 depending on necessity, and the above-described procedures are executed.

Meanwhile, the program module 1093 and the program data 1094 according to the identifying program are stored not only in the hard disk drive 1090 but also may be stored in, for example, a removable storage medium and may be read by the CPU 1020 via the disk drive 1041 and the like. Alternatively, the program module 1093 and the program data 1094 according to the identifying program may be stored in another computer connected via a network such as a local area network (LAN) and a wide area network (WAN), and then read by the CPU 1020 via the network interface 1070.

REFERENCE SIGNS LIST

10 IDENTIFYING DEVICE
10a MALWARE EXECUTION ENVIRONMENT UNIT
11 Malware
12 GUEST OS
13 VIRTUAL COMPUTER
13a INSTRUCTION MONITORING UNIT
13b DATA FLOW ANALYZING UNIT
14 LOG DB
15 CREATION UNIT
16 IDENTIFYING UNIT
20 MALICIOUSNESS INFORMATION DB

The invention claimed is:

1. An identifying device comprising:
processing circuitry configured to
monitor malware to be analyzed and acquire, as log data, the malware, download data downloaded from a communication destination, and a relation of data transfer performed with the malware or the communication destination of the download data;
create, by using the log data acquired by the processing circuitry, a dependency relation graph that is a digraph in which the malware, the download data, and the communication destination are set as nodes and a dependency relation of each node is set as an edge; and
detect a malicious node by collating the respective nodes of the dependency relation graph created by the processing circuitry with known maliciousness information, and trace an edge in a direction from a terminal point to a start point while setting the malicious node as a base point, and then identify a traced node as a new malicious node, wherein
the processing circuitry performs monitoring by assigning a monitoring target tag to a file of the malware, and in the case where the malware calls an API to be monitored, the processing circuitry acquires the log data by assigning, to data related to the API, a tag that can uniquely identify a transmission source of the data and then tracking propagation of the data assigned with the tag, wherein
the processing circuitry further performs monitoring by acquiring a value of an instruction pointer register that corresponds to an instruction, and, when a memory region indicated by the instruction pointer register is assigned with the monitoring target tag, determining the instruction as the file of the malware.

2. The identifying device according to claim 1, wherein in the case where a node identified as the malicious node is a communication destination node, the processing circuitry identifies the communication destination node as a malicious site.

3. The identifying device according to claim 2, wherein in the case where the node identified as the malicious node is a communication destination node, the processing circuitry identifies the communication destination node as a malicious site, and additionally, in the case where a node immediately before reaching the communication destination node is a download data node, the processing circuitry detects the node identified as the malicious site as a malware download site.

4. An identifying method executed in an identifying device, comprising processes of:
monitoring, by processing circuitry of the identifying device, malware to be analyzed and acquiring, as log data, the malware, download data downloaded from a communication destination, and a relation of data transfer performed with the malware or the communication destination of the download data;
creating, by the processing circuitry, by using the log data acquired in the monitoring process, a dependency relation graph that is a digraph in which the malware, the download data, and the communication destination are set as nodes and a dependency relation of each node is set as an edge; and
detecting, by the processing circuitry, a malicious node by collating the respective nodes of the dependency relation graph created in the creating process with known maliciousness information, and tracing an edge in a direction from a terminal point to a start point while setting the malicious node as a base point, and then identifying a traced node as a new malicious node, wherein
the processes includes monitoring by assigning a monitoring target tag to a file of the malware, and in the case where the malware calls an API to be monitored, the processing circuitry acquires the log data by assigning, to data related to the API, a tag that can uniquely identify a transmission source of the data and then tracking propagation of the data assigned with the tag, wherein
the processes further includes monitoring by acquiring a value of an instruction pointer register that corresponds to an instruction, and, when a memory region indicated by the instruction pointer register is assigned with the monitoring target tag, determining the instruction as the file of the malware.

5. A non-transitory computer-readable recording medium having stored an identifying program to cause a computer to execute steps of:
monitoring malware to be analyzed and acquiring, as log data, the malware, download data downloaded from a communication destination, and a relation of data transfer performed with the malware or the communication destination of the download data;
creating, by using the log data acquired in the monitoring step, a dependency relation graph that is a digraph in which the malware, the download data, and the communication destination are set as nodes and a dependency relation of each node is set as an edge; and
detecting a malicious node by collating the respective nodes of the dependency relation graph created in the creating step with known maliciousness information, and tracing an edge in a direction from a terminal point to a start point while setting the malicious node as a base point, and then identifying a traced node as a new malicious node, wherein the steps includes monitoring by assigning a monitoring target tag to a file of the malware, and in the case where the malware calls an API to be monitored, the processing circuitry acquires the log data by assigning, to data related to the API, a tag that can uniquely identify a transmission source of the data and then tracking propagation of the data assigned with the tag, wherein the steps further includes monitoring by acquiring a value of an instruction pointer register that corresponds to an instruction, and, when a memory region indicated by the instruction pointer register is assigned with the monitoring target tag, determining the instruction as the file of the malware.

* * * * *